UNITED STATES PATENT OFFICE.

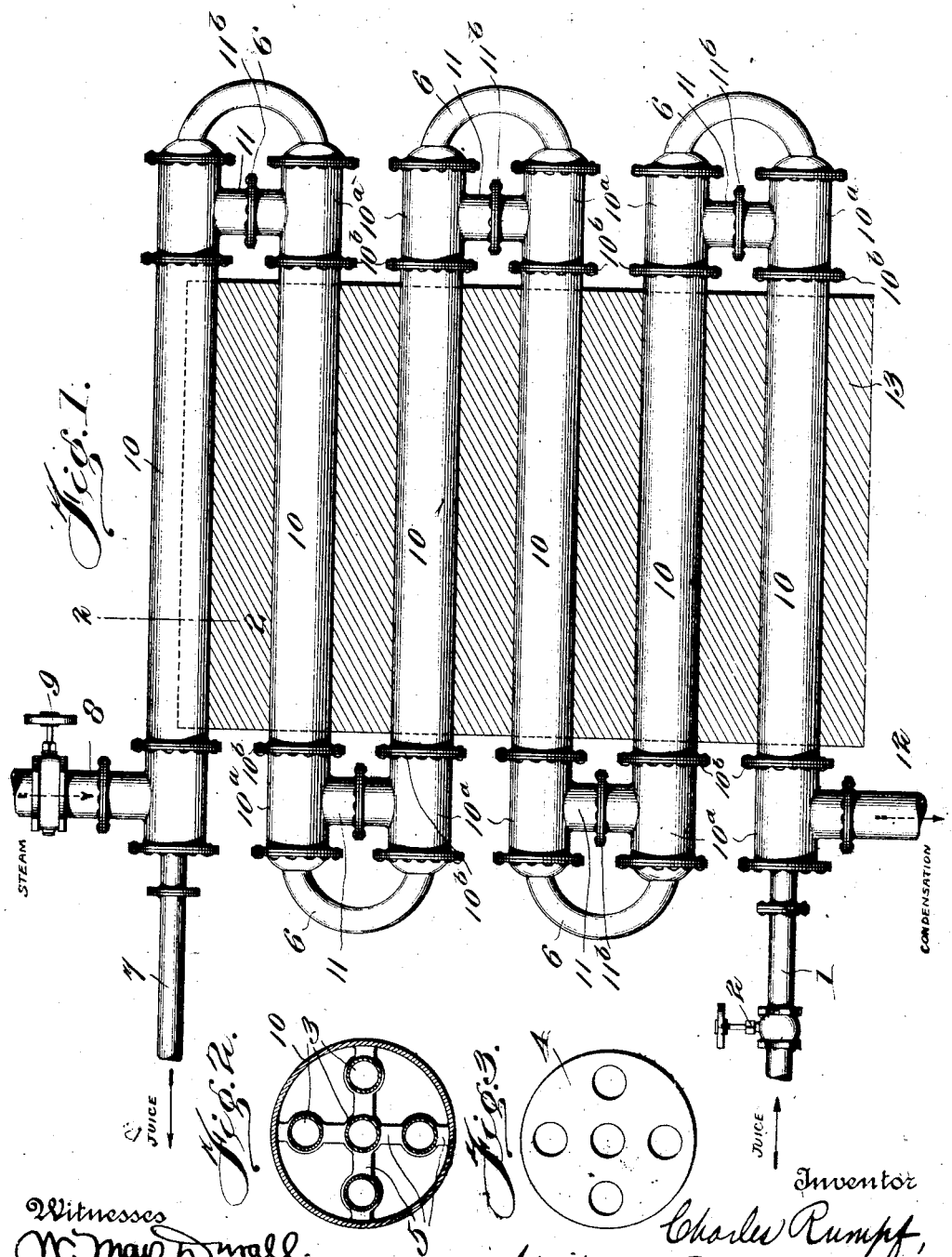

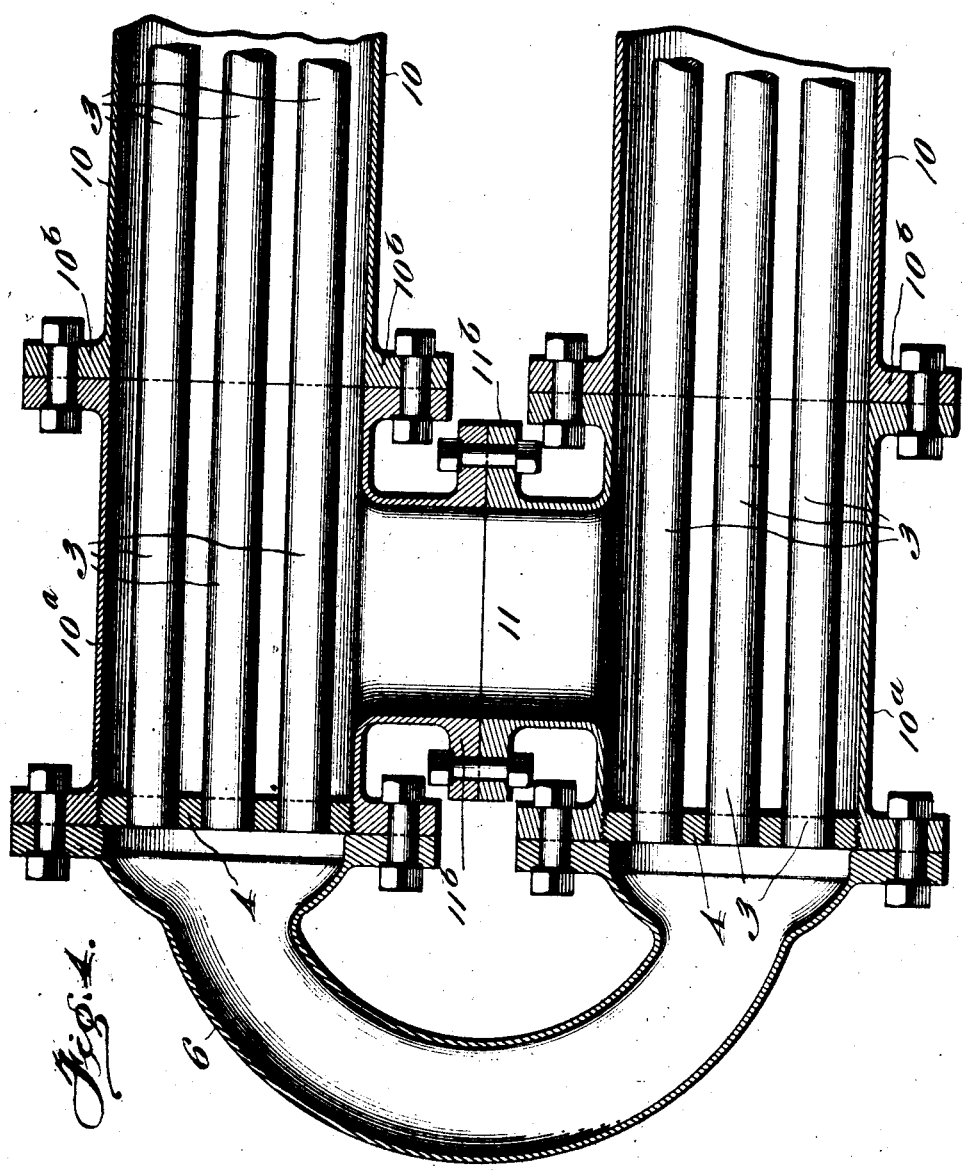

CHARLES RUMPF, OF NAPOLEONVILLE, LOUISIANA.

SYSTEM OF CLARIFICATION.

1,037,798.

Specification of Letters Patent. Patented Sept. 3, 1912.

Application filed November 3, 1911. Serial No. 658,391.

*To all whom it may concern:*

Be it known that I, CHARLES RUMPF, a citizen of the United States, residing at Napoleonville in the parish of Assumption and State of Louisiana, have invented certain new and useful Improvements in Systems of Clarification; and I do hereby declare the following to be a full, clear, and exact description of the invention, such as will enable others skilled in the art to which it appertains to make and use the same.

My invention relates to improvements in systems of clarification, and more especially to that mode of clarification in which the juice is heated to a temperature considerably above the boiling point, for the purpose of coagulating out the albumin contained in the juice.

It is well known that the juice of the cane and of beets, more especially cane juice, contains more or less albumin, which in the normal uncooked condition is apt to be sticky, or gummy, and to interfere with the proper clarification of the juice; but when this albumin is raised to the temperature of about 220° F., it is coagulated, or cooked, and may be readily strained off, or removed in the usual way, such as by filter presses, or the like, as is well known in the art.

While my invention is applicable to the treatment of the juice from beet roots, it is more especially suitable for use in the clarification of cane juice.

According to my invention, the juice is treated with lime and sulfur in the usual way, and is then passed through the superheat clarifying apparatus, as will now be described, reference being had to the accompanying drawings, in which the same parts are indicated by the same numerals throughout the several views.

Figure 1 is a diagrammatic view of the apparatus. Fig. 2 shows a section through one of the heating drums, showing the pipes for the juice in section, the section being along the line 2—2 of Fig. 1. Fig. 3 is a plan view of one of the heads in the drum through which the tubes pass, Figs. 2 and 3 being on a larger scale than Fig. 1, and Fig. 4 shows the steam and juice connections between the heating drums.

The juice is brought from the juice tanks (not shown) through the pipe 1 at the bottom of the apparatus, which is controlled by the valve 2. Thence it passes through the copper pipes 3, mounted in the brass head 4, (see Figs. 3 and 4), and these pipes may be steadied in any suitable way, as by the spider 5 (see Fig. 2). There are five of these pipes 3 shown in each heating drum 10, but the number may be varied, if desired. The juice pipes in the heating drums are connected together by end connections 6, preferably of copper or brass; and the juice is finally carried off by the copper pipe 7. The steam is introduced into the iron heating drums 10, preferably from the top of the apparatus, as by a pipe 8, controlled by a valve 9, and these drums are connected together in series by the connections 11. Finally, the water of condensation, with the uncondensed vapors from the steam, is drawn off at the bottom by the pipe 12. The drums 10 are supported in any convenient way, as by the masonry 13.

For convenience in assembling the parts, the ends of the drums 10 are made up of separate sections $10^a$, secured to the drums proper 10 by means of flanges $10^b$ and suitable bolts; and these end portions are connected together by the flanges $11^b$ and bolts passing therethrough, as shown in Fig. 4.

It will be noted that the cold juice enters at the bottom of the apparatus, and traveling through copper or brass pipes or passages, it rises, as it gets warmer, and flows in the opposite direction to the incoming steam, which enters the apparatus from the top, and is drawn off at the bottom. The result is that the juice is rapidly and progressively heated to a high temperature, and then is carried off after the heating has been effected; while the steam is gradually condensed, being hottest at the top of the apparatus, and decreasing in temperature toward the bottom, thus securing the desired effect in an economical way. Either live steam may be used, or the pipe 8 may be connected to the exhausts from one or more of the various engines used in the factory.

By having the staggered connections between adjacent drums near the ends of the drums, the steam is caused to flow continuously in one direction through the series; and by having the curved end connections 6 at the opposite ends of the drums, with the funnel-shaped openings into the space beyond the heads 4, a path for the juice is provided which is free from all pockets or corners into which the sediment from the juice might settle or accumulate; and thus the apparatus is substantially self-cleaning, since the flow of the juice through the pipes and curved end connections will ordinarily keep the same clean. Moreover, when it is desired to wash out the apparatus, it will be evident that there will be no place for the sour juice, or solid impurities, to accumulate and the apparatus may be thoroughly cleansed.

It will be noted that the juice is protected from discoloration by passing through copper or brass pipes, or passages; while the steam passes through the heating drums, and around the juice pipes; and these drums are preferably made of iron or steel, not only to secure the requisite strength, but because they are economical of construction, and it is immaterial whether the water of condensation is discolored or not by the iron.

It will be obvious that the number of the superposed heating drums 10 may be increased or decreased at will, and that any suitable support, such as 13, for the various drums may be used, if desired. It will also be obvious that various modifications might be made in the herein described apparatus, which could be used without departing from the spirit of my invention.

Having thus described my invention, what I claim and desire to secure by Letters Patent of the United States is:—

1. An apparatus for clarifying cane juice, comprising a series of drums with staggered connections between said drums, diaphragms closing the ends of said drums, tubes for the cane juice opening through the diaphragms at each end of the drum, a curved end connection connecting the tubes of one drum with the tubes of the next, a steam pipe opening into the shell of the first drum, and means for delivering the water of condensation from the shell of the last drum, with steam connections between the several drums, substantially as described.

2. An apparatus for clarifying cane juice, comprising a series of drums with staggered connections between said drums, diaphragms closing the ends of said drums, tubes for the cane juice opening through the diaphragm at each end of the drum, a curved end connection connecting the tubes of one drum with the tubes of the next, each of said end connections having a funnel-shaped mouth at each end and a curved central portion connected thereto, a steam pipe opening into the shell of the first drum, and means for delivering the water of condensation from the shell of the last drum, substantially as described.

In testimony whereof, I affix my signature, in presence of two witnesses.

CHARLES RUMPF.

Witnesses:
J. H. SHEPHERD,
CHAS. DICKINSON.